United States Patent [19]

Akasu

[11] Patent Number: 4,945,875
[45] Date of Patent: Aug. 7, 1990

[54] ELECTRONIC IGNITION TIMING CONTROL DEVICE

[75] Inventor: Masahira Akasu, Himeji, Japan

[73] Assignee: Mitsubishi Denki Kabushiki Kaisha, Tokyo, Japan

[21] Appl. No.: 318,799

[22] Filed: Mar. 3, 1989

[30] Foreign Application Priority Data

Mar. 7, 1988 [JP] Japan .................................. 63-54301
Mar. 7, 1988 [JP] Japan .................................. 63-54306
Mar. 7, 1988 [JP] Japan .................................. 63-54302

[51] Int. Cl.$^5$ .............................................. F02D 5/15
[52] U.S. Cl. ..................................... 123/422; 123/423
[58] Field of Search ............... 123/414, 418, 419, 422, 123/436, 423

[56] References Cited

U.S. PATENT DOCUMENTS

| | | | |
|---|---|---|---|
| 4,520,781 | 6/1985 | Nishida | 123/414 |
| 4,586,473 | 5/1986 | Nguyen | 123/419 |
| 4,747,383 | 5/1988 | Kimura et al. | 123/422 |
| 4,799,469 | 1/1989 | Nagano et al. | 123/419 X |

Primary Examiner—Tony M. Argenbright
Attorney, Agent, or Firm—Sughrue, Mion, Zinn, Macpeak and Seas

[57] ABSTRACT

The rate of variation in the rotational period of an engine is determined by the use of a pulse signal generated according to the rotation of an engine crankshaft, and the value of the rate of variation thus determined is compared with a previously set value of judgement of the rate of variation. When the rate of variation is under the judged value, ignition is performed at an advance or retard timing given by calculation; and when the rate of variation exceeds the judged value, an ignition signal is used as a reference crank position signal in place of an ignition command signal obtained by calculation.

12 Claims, 12 Drawing Sheets

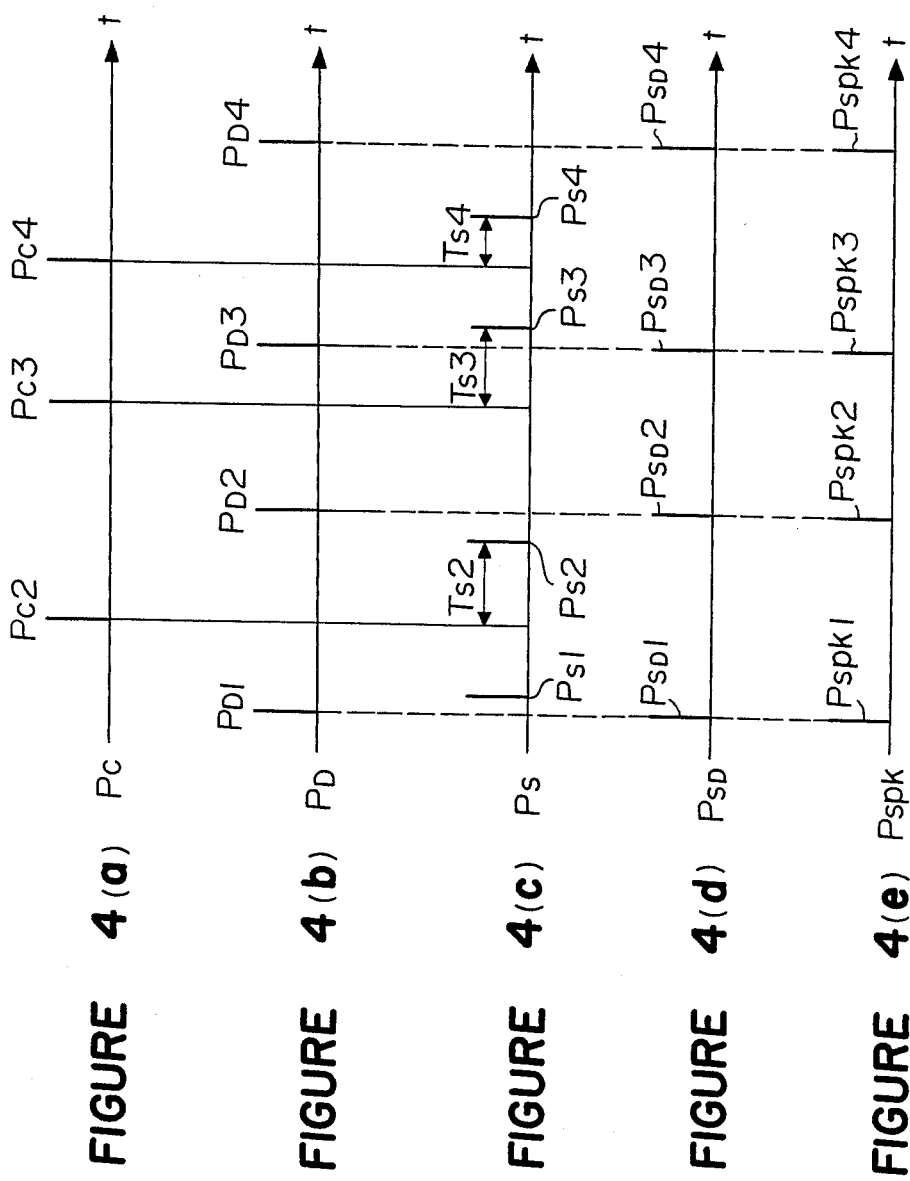

ELECTRONIC IGNITION TIMING CONTROL DEVICE

BACKGROUND OF THE INVENTION

1. Field of the Invention

The present invention relates to an ignition timing control device which electronically controls the ignition timing of an engine.

2. Discussion of Background

FIGS. 9 to 12 show a prior art electronic ignition timing control device disclosed, for example, in Japanese Examined Patent Publication No. 37457/1986. In these drawings, numeral 1 denotes a crankshaft of a four-stroke-cycle four-cylinder engine, and numeral 2 is a circular disc fixedly mounted on the crankshaft and rotating with the rotation of the crankshaft. On the circumference of this circular disc are fixed magnetic bodies 3A and 3B disposed 180 degrees apart from each other. Numeral 4 represents an electromagnetic pickup which is disposed in the vicinity of the outer periphery of the circular disc 2 and produces a reference position pulse P ($P_1$, $P_2$, $P_3$, ...) each time it faces the electromagnetic bodies 3A and 3B. This pickup is so constituted that the reference position of the engine crankshaft set at the upper deadpoint of the engine is detected every 180 degrees of rotation of the crankshaft 1.

Furthermore, numeral 5 indicates an oscillator which outputs a clock pulse CP. Numeral 6 is a period measuring means which measures pulse spacing T ($T_1$, $T_2$, ...) Of the reference position pulse P in time sequence on the basis of the clock pulse CP produced by the oscillator 5. Numeral 7 is a period memory means which, when the reference position pulse P is inputted, stores in a memory a period measured by the period measuring means 6 when a preceding reference position is inputted. Numeral 8 represents an acceleration-deceleration corresponding time output means for determining the value $\Delta T$ corresponding to the accelerated speed of engine by deducting a period stored in the period memory means 7, from the period measured by the period measuring means 6. Numeral 9 is an ignition timing computing means which calculates out a spark advance angle $\theta$ on the basis of the reference crank position to be detected by the electromagnetic pickup 4 in accordance with information S such as engine speed and manifold pressure. And numeral 10 is an ignition time computing means which inputs the measured period T, the acceleration-deceleration corresponding time $\Delta T$, and the value of spark advance $\theta$, and predictively calculates and outputs a time interval TS from the output of the reference position pulse P until the output of an ignition command signal PS, simultaneously with the reference position pulse $P_3$, by a method described later. A first ignition command output means 11 to which the time interval TS outputted from this ignition time computing means 10, the clock pulse CP, and the reference position pulse P are inputted, is designed to give out the ignition command signal PS at the time interval TS after the reference position pulse P is outputted. Receiving this ignition command signal PS, an ignition device 12 operates Now, let the reference position pulse P produced from the electromagnetic pickup 4 be $P_1$, $P_2$, $P_3$, and $P_4$ in order of generation FIG. 10a, and the period measuring means 6, based on the clock pulse CP of the reference oscillator 5, measures, in sequence of time, the pulse period $T_1$ of the reference position pulse $P_1$ and $P_2$ at the time of input of the reference position pulse $P_2$, and the pulse period $T_2$ of $P_2$ and $P_3$ at the time of input of the reference position pulse $P_3$. The period memory means 7 functions to store, at the time of input of the reference position pulse $P_3$, the period $T_1$ which was measured by the period measuring means 6, for example, when the reference position pulse $P_2$ is inputted.

Next, let $P_4$ be the reference position pulse P given out after the reference position pulse $P_3$, and the period Tf from the reference position pulse $P_3$ to $P_4$ is predictively computed by the ignition time computing means 10 immediately after the generation of the reference position pulse $P_3$.

The predictive computation of the period Tf is performed as described below.

When the engine is running at a fixed speed, the measured period $T_2$=the stored period $T_1$, and accordingly the subsequent period Tf may be predicted to be fixed as $$Tf = T_2 \ldots \ldots \quad (1)$$

When the engine speed is not fixed as during acceleration or during deceleration, the acceleration-deceleration corresponding time $\Delta T$ produced by variation in the engine speed is predicted as $$Tf = T_2 - \Delta T \ldots \ldots \quad (2)$$

For the acceleration-deceleration corresponding time $\Delta T$, the time given by the following formula (3) from, for example, the memory period T1 and the measurement period $T_2$ is used.

$$\Delta T = T_1 - T_1 \ldots \ldots \quad (3)$$

From the predictive period Tf and the value of spark advance angle $\theta$, the time interval TS till the following firing time can be given by the following formula. (FIG. 10a)

$$TS = \frac{180 - \theta}{180} \times Tf \quad (4)$$

As previously stated, engine ignition takes place after the lapse of the time TS given by the formula (4) on the basis of the generation of the reference position pulse. ($PS_3$ in FIG. 10b).

The ignition timing control device shown in FIG. 1 accurately predicts the period Tf by the use of the formula (1) or (2) when the engine is operating at a constant speed or during continuous acceleration or during continuous deceleration, and, consequently, also accurately controls the ignition timing.

In actual vehicle operation, however, abnormal variation in engine speed sometimes occurs not only during the above described constant-speed engine operation, continuous acceleration or continuous deceleration but also in case of clutch misoperation or abrupt starting of vehicle by a beginning driver.

This abnormal variation in the engine speed is caused rather by mechanical motion of the vehicle body, suspension, engine mounting, and so forth than by the burning of the mixture in cylinders. There exists no correlation between the engine speed and the variation in the engine speed. And the direction of the variation is not fixed and moreover the amount of the variation is very large. It is, therefore, difficult to predict the period Tf from the rotational period of the engine.

FIG. 11 shows an example of such an abnormal variation in the engine speed experimentally created in an actual engine.

This experiment was conducted using a car mounted with a four-stroke-cycle, four-cylinder 2,000 cc engine.

The engine speed indicated when the clutch was suddenly connected, with the engine started from a standstill and raced up to 2,000 rpm and with the transmission shifted into the second-speed gear, was recorded. After the connection of the clutch, the engine speed indicated a variation within the range of from about 200 rpm to about 800 rpm.

A part of the state of generation of the reference position pulse P during this speed variation is shown in FIG. 12a. From a system shown in FIG. 12a, the period Tf can be predicted on the basis of the formula (2): Tf=37 (ms) from $T_1$=69 (ms) and $T_2$=53 (ms). The actual time interval $T_3$, however, is 65 (ms), which largely differs from a predicted value.

Therefore, if ignition control is made at this time interval TS computed from this predicted period Tf, the time interval TS when the spark advance angle $\theta$ is 0°, will be TS=37 (ms) from the formula (4), and accordingly, ignition takes place 37 (ms) after the input of the reference position pulse $P_3$.

That is, the ignition occurs at a position advanced about $(65-37)/65 \times 180 = 78°$ as compared with a target ignition timing. ($PS_3$ in FIG. 12b)

If the length of the period $T_1$ and $T_2$ is opposite to that in FIG. 12a, there will occur an abnormal retardation of spark angle which is not illustrated here.

Particularly, in the event of abnormally advanced ignition timing, excessive knocking will take place or the engine will stop because of the occurrence of a counter torque. If this abnormal speed variation continues, the internal pressure of cylinders of the engine will excessively rise, resulting, in the worst case, in engine trouble.

SUMMARY OF THE INVENTION

The present invention has been accomplished in an attempt to solve the problem described above, and accordingly it is an object of the present invention to provide an ignition timing control device that controls the ignition timing to prevent abnormal spark advance or retard in case of abnormal variation in the engine speed.

In an aspect of the present invention, there is provided an ignition timing control device comprising: a period measuring means which measures the rotational period of engine from the time the engine crankshaft turns through the specific range of crank angle; an ignition timing computing means that computes the ignition timing in accordance with engine operating conditions; an ignition time computing means that computes a time from a specific crank angle position to the ignition timing, from the rotational period measured and the ignition timing computed by the ignition timing computing means; a first ignition command signal output means which outputs an ignition command signal to the ignition device after the lapse of the time computed by the ignition time computing means from the time of detection of the specific crank angle position; a reference position detecting means which produces a reference position signal at a specific crank reference position of engine; a second ignition command signal output means which outputs an ignition command signal when the reference position signal is generated; a memory means for storing the rotational period measured; a rate of variation computing means which compares for computation between the rotational period previously stored in the memory means at the time of measurement of the rotational period and the rotational period measured this time; and a means which selects to output an ignition command signal to the ignition device such that when the rotational period has varied in excess of the specific rate of variation, the next ignition will be effected by an ignition command signal produced from the second ignition command signal output means.

In an aspect of the present invention, there is provided an ignition timing control device comprising: a first reference position detecting means which generates a first reference position signal at a specific crank angle position of the engine; a second reference position detecting means which produces a second reference position signal at a specific position of a crank angle different from the crank angle stated above; an ignition timing computing means which computes the ignition timing in accordance with engine operating conditions; a rotational period measuring means which determines the rotational period of the engine from at least the first or second reference position signal; an ignition time computing means which computes the time from the first reference position till the ignition timing, using the rotational period determined above and the ignition timing computed by the ignition timing computing means; a first ignition command signal output means which outputs an ignition command signal to the ignition device after the lapse of the time from the time of generation of the first reference position signal till the time computed by the ignition time computing means, a second ignition command signal output means which outputs an ignition command signal when the second reference position signal is generated; a period variation computing means which determines a variation in the rotational period of the engine from the rotational period between different crank angle positions of the engine which is obtained at least from the first or second reference position signal; and a means which selects to output an ignition command signal to the ignition device such that ignition will be effected by the ignition command signal from the second ignition command signal output means when the output of the period variation computing means has exceeded the specific rate of variation.

In an aspect of the present invention, there is provided an ignition timing control device comprising: a first reference position detecting means which produces a first reference position signal at a specific crank angle position of engine; a second reference position detecting means which produces a second reference position signal at a specific position of crank angle different from the crank angle mentioned above; a rotational period measuring means which determines the rotational period of the engine from at least the first or second reference position signal; an ignition timing computing means which computes the ignition timing in accordance with engine operating conditions; an ignition coil energizing time computing means which computes the time to energize an ignition coil; an ignition time computing means which computes the time from the first reference position mentioned above till the ignition timing, using the rotational period and ignition timing computed above; a first ignition control signal output means which outputs a first ignition control signal to the ignition device, for starting energizing the ignition coil before the time to energize the ignition coil after the end of the ignition timing and for deenergizing the ignition coil after the lapse of the time computed by the ignition time computing means from the time of generation of the first reference position signal; a second ignition control signal output means which outputs a second ignition control signal, for starting energizing the ignition coil at the time of generation of the first reference position signal and deenergizing the ignition coil at the time of generation of the second reference position signal; a period variation computing means which determines a change in the rotational period of engine from the rotational period between different crank angle positions of engine obtained at least from the first or the second reference position signal; and a means for selecting the outputting an ignition control signal to the ignition device so that ignition coil control will be effected by the second ignition control signal when the output of the period variation control means has exceeded a specific value.

BRIEF DESCRIPTION OF THE DRAWINGS

FIGS. 4(*a–e*) are an exemplary waveform diagram of operation of the second embodiment;

DESCRIPTION OF THE PREFERRED EMBODIMENTS

Figure 1:
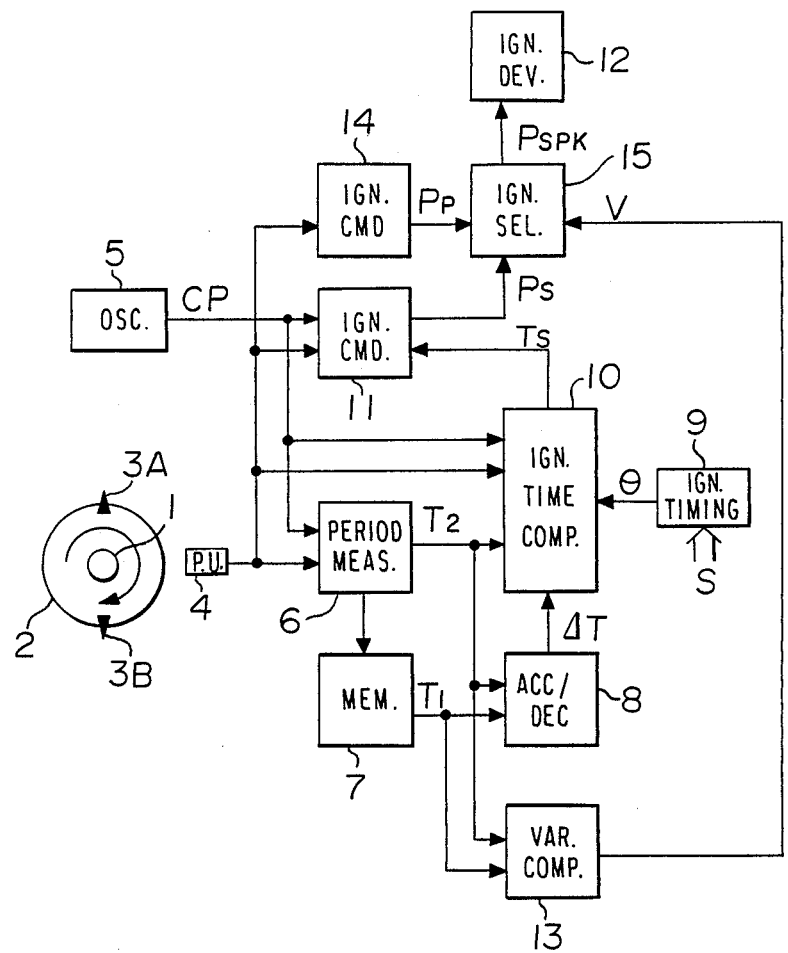
FIG. 1 is a block diagram showing an ignition timing control device according to a first embodiment of the present invention.
Figure 9:
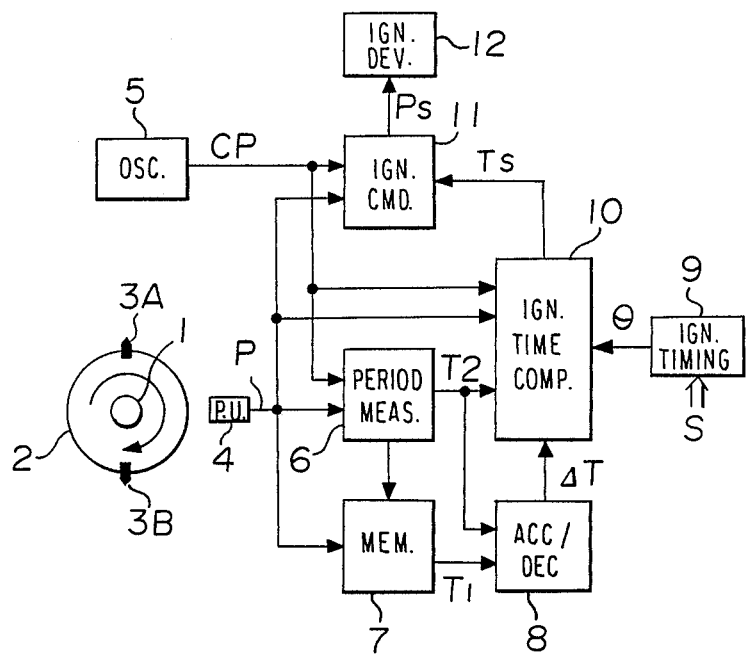
FIG. 9 is a block diagram of an ignition timing control device explaining a prior art.

Hereinafter, a first embodiment of an ignition timing control device according to the present invention will be described with reference to FIGS. 1 and 2. In FIG. 1 in which the same reference numerals are used for the same parts appearing also in FIG. 9, numeral 13 denotes a rate of variation computing means which receives a measured period $T_2$ from a period measuring means 6 and a stored period $T_1$ from a period memory means 7, and determines the rate of variation in the rotational period of engine through computation; numeral 14 indicates a second ignition command output means which outputs a signal Pp, as an ignition command signal, simultaneously with a crank reference position pulse P; and numeral 15 is an ignition command selection means which is constituted such that when the rate of variation computed by the rate of variation computing means 13 is under a specific judged value Vr, an ignition command output PS of a first ignition command output means 11 is selected, and that when the rate of variation V is above the judged value Vr, an ignition command output PP of a second ignition command output means 14 is selected as an ignition command signal PSPK, which is then sent out to an ignition device 12.

The rate of variation computing means 13 is used to determine the rate of variation in the engine rotational period, using the following formula (5).

$$V = \frac{|T_1 - T_2|}{T_2} \quad (5)$$

Figure 10A:
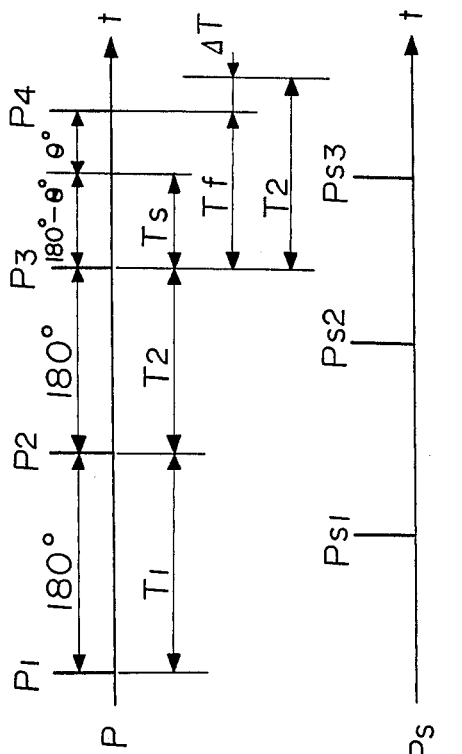
FIGS. 10(*a*), 10(*b*), 11, 12(*a*) and 12(*b*) are waveform diagrams explaining the operation of the ignition timing control device of FIG. 9.
Figure 10B:
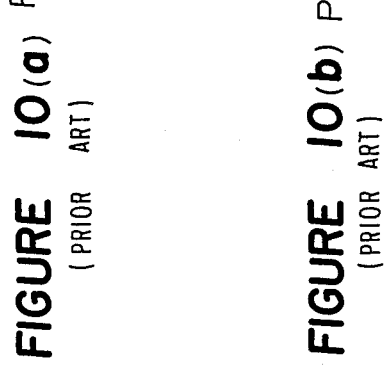
Figure 11:
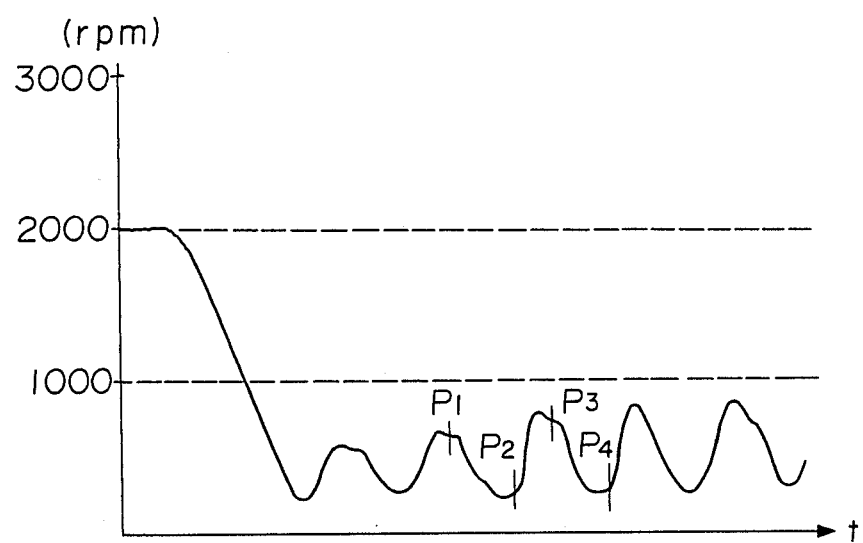
Figures 12A, 12B:
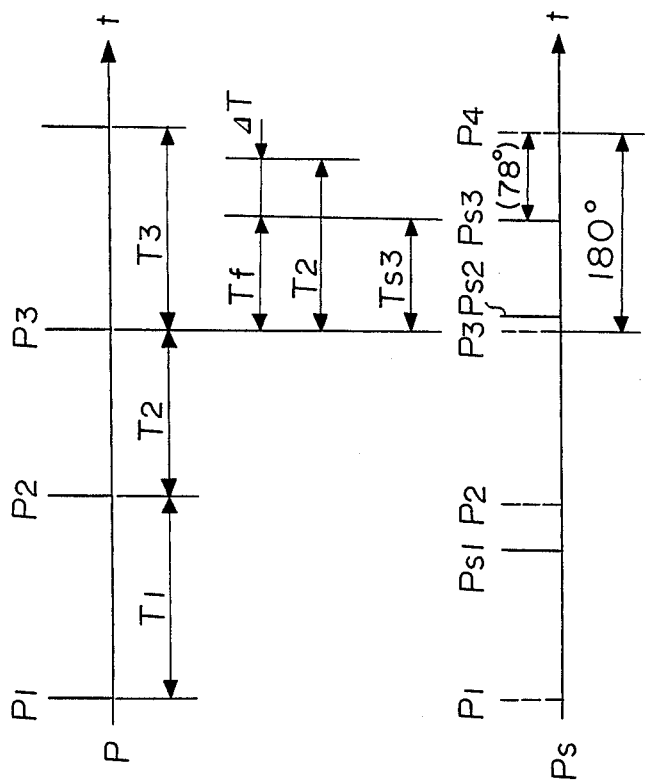

Now, consider the same variation in the rotational period (FIG. 12*a*) as the previously shown in FIG. 10*a*, and V=0.30 will be given by the formula (5), using $T_1 = 69$ (ms) and $T_2 = 53$ (ms).

The ignition command selection means 15 functions to set the judged value Vr of the rate of variation at, for example, 0.15. When the rate of variation V determined by the rate of variation computing means 13 is under 0.15, the ignition command output PS of the first ignition command output means 11 is selected to output the ignition command signal PSPK to the ignition device 12, thus similarly controlling the ignition timing as in the prior-art device.

When the rate of variation V stated above is 0.15 or more, the ignition command selection means 15 selects and outputs, to the ignition device 12, the ignition command output PP of the second ignition command output means 14 which outputs, as an ignition command signal PSPK, an ignition command signal simultaneously with the reference crank position pulse P detected by the electromagnetic pickup 4 in place of the ignition command output PS of the first ignition command output means 11. That is, when the rate of variation V is 0.15 or more, the ignition takes place at the reference crank position.

Figures 2A, 2B, 2C, 2D:
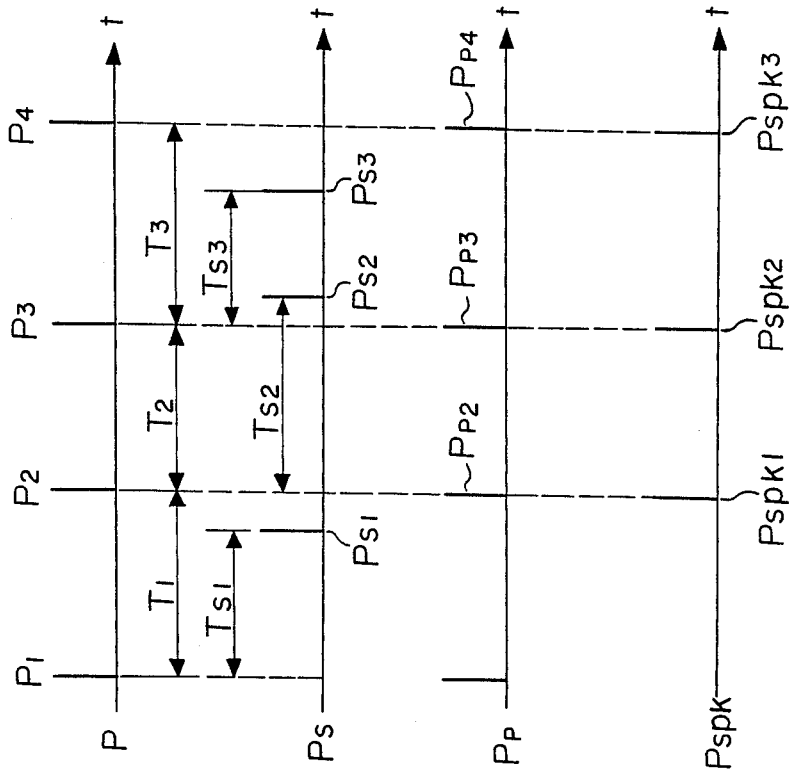
FIGS. 2(*a–d*) are an exemplary waveform diagram of operation in FIG. 1.

Since the rate of variation V determined by the rate of variation computing means 13 is 0.30, which is larger than the judged value Vr (0.15) of the rate of variation, at the time the reference crank position pulse $P_3$ when the variation in FIG. 2*a* has occurred, the ignition is effected according to the ignition command output PP of the second ignition command output means 14, that is, in accordance with an ignition command signal PSPK 3 at the timing corresponding to the reference crank position $P_4$. The reference crank position is set near TDC on the compression stroke of the engine, and therefore if the ignition is effected at the reference position, there will not occur any problem with the engine and combustion is performed with stability. Consequently, there will not occur any abnormal spark advance (78° C.) which has been a problem for similar devices of prior art.

In the meantime, in ordinary operating conditions, the engine speed varies most during racing after idling, increasing about 100 rpm per ignition period at the engine speed of about 1,000 rpm. The rate of period variation at this time will be V=0.10 when calculated by the formula (5).

Since this value is less than the judged value Vr (=0.15) of the rate of variation previously stated, the ignition command output PS of the first ignition command output means 11 will be selected to control the spark advance angle.

In ordinary operating conditions, as described above, the spark advance is properly performed, and therefore ignition can take place at the reference crank position only when there has occurred an abnormal variation in the engine speed.

In the above embodiment, the formula (5) was used to give the rate of variation V in the engine rotational period, but should not be limited thereto because the same effect is attainable by some other formulas capable of detecting abnormal variation in the engine speed. Also, it should be noted that the judged value Vr of the rate of variation is not limited to 0.15.

According to the first embodiment of the present invention, as described above, if there has occurred in the engine a variation in the rotational period such that the variation in the rotational period exceeds a specific rate, the crank reference position signal is delivered as an ignition command signal to the ignition device in place of an ignition command signal to be produced during ordinary ignition time control. Therefore, in the event of any abnormal variation in the rotational period, the ignition timing control will be made with stability at the reference crank position, thereby preventing abnormal spark advance and retard as well.

Hereinafter, the second embodiment of the present invention will be described with reference to FIGS. 3 to 5.

Figure 3:
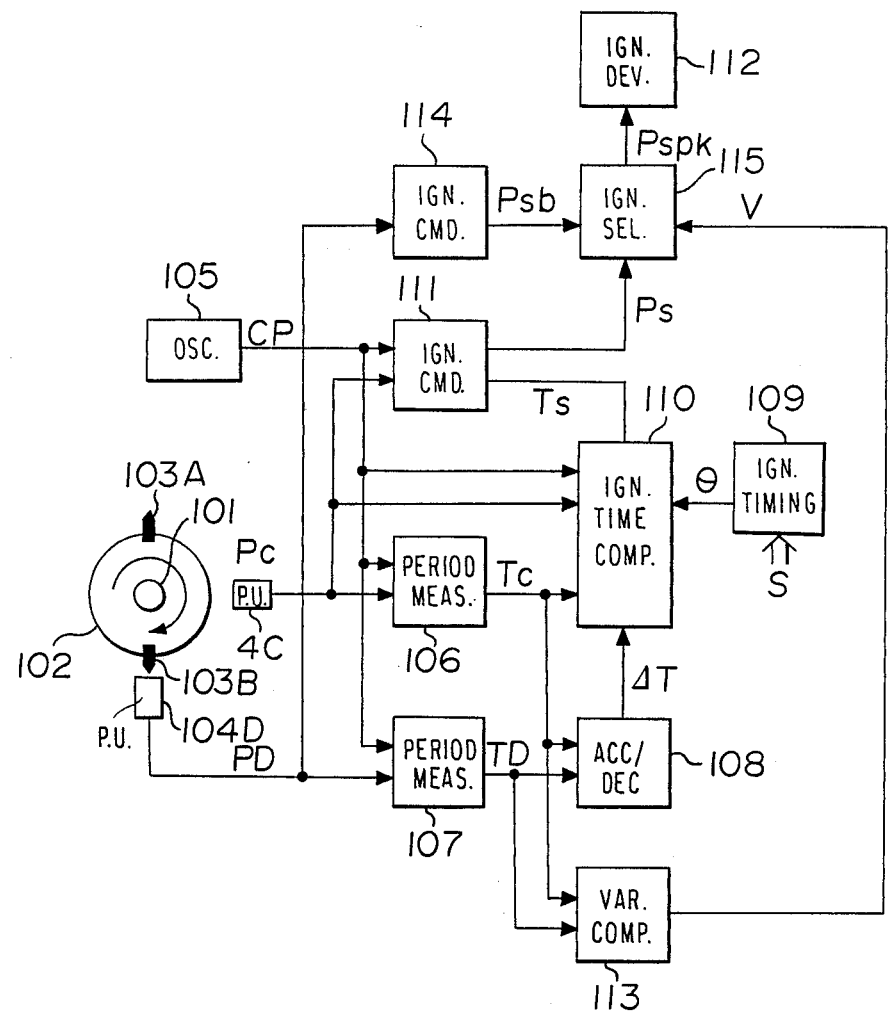
FIG. 3 is a block diagram of the ignition timing control device showing a second embodiment of the present invention.

In FIG. 3, numeral 101 represents a crankshaft of a four-stroke-cycle, four-cylinder engine, and numeral 102 denotes a circular disc fixedly mounted on this crankshaft to rotate therewith. On the circumference of this circular disc are fixedly installed magnetic bodies 103A, 103B disposed 180 degrees apart from each other. Numerals 104C and 104D are electromagnetic pickups, which are arranged close to the outer periphery of the circular disc 102 with a specific angular difference provided therebetween, and produce a reference position pulse PC or PD each time they face the magnetic body 103A or 103B. The electromagnetic pickup 104D is provided to detect a crank angle position near TDC on the compression stroke of engine, while the other electromagnetic pickup 104C is disposed in a position 90 degrees apart from the electromagnetic pickup 104D along the outer periphery of the circular disc 102, such that they alternately produce the reference position pulses PC and PD every time the crankshaft 101 makes a 90-degree turn. Numeral 105 represents an oscillator which outputs a clock pulse CP. Numerals 106 and 107 indicate first and second period measuring means for measuring a pulse spacing TC of the reference position pulse PC and a pulse spacing of the reference position pulse PD on the basis of the clock pulse CP from the oscillator 105. Numeral 108 denotes an acceleration-deceleration corresponding time output means which outputs a value $\Delta T$ correspondingly to the rotational acceleration of engine by deducting a period measured by the second period measuring means 106 from a period measured by the first period measuring means 107 when the reference position pulse PC is inputted. An ignition timing computing means 109, an ignition time computing means 110, a first ignition command output means 111 and an ignition device 112 are the same as those used in the first embodiment shown in FIG. 1. Numeral 113 represents a rate of variation computing means which receives the period TC measured by the first period measuring means 106 and the period TD measured by the second period measuring means 107, and determines the rate of variation in the rotational period of engine through computation. Numeral 114 is a second ignition command output means which outputs a signal PSD as an ignition command signal simultaneously with the reference crank position pulse PD. And numeral 115 indicates an ignition command selection means which is so constituted that when the rate of variation as a result of computation by the rate of variation computing means 113 is less than the specific judged value Vr of the rate of variation, the ignition command output PS of the first ignition command output means 111 is selected, and when the rate of variation V exceeds the judged value Vr, the ignition command output PSD of the second ignition command output means 114 is selected as the ignition command signal PSPK, and an ignition command signal PSPK is sent out to the ignition device 112.

The rate of variation computing means 113 is used to give the rate of variation V in the rotational period of engine by, for example, the following formula 6.

$$V = \frac{|TD_3 - TC_4|}{TC_4} \quad (6)$$

Figure 5A:
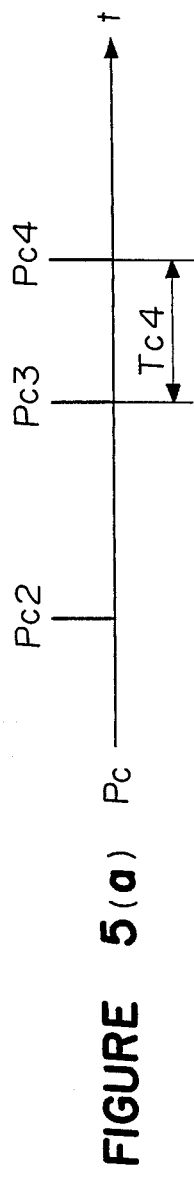
FIGS. 5(*a–c*) are an exemplary diagram of operation of a typical ignition control device.
Figure 5B:
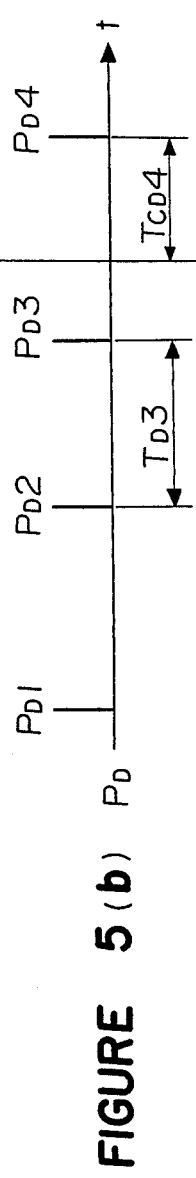
Figure 5C:
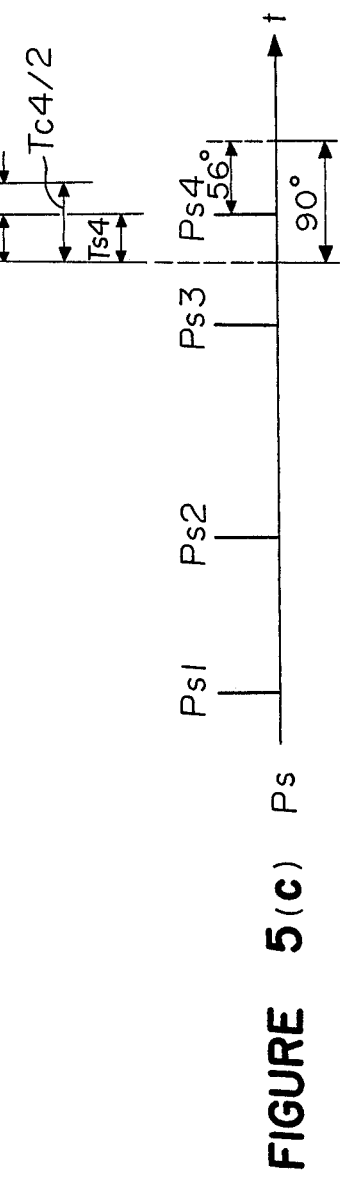

In the varying state of engine speed as shown, for example, in FIG. 5, when the spacing $TC_4$ of the pulses $PC_3$ and $PC_4$ of the reference position pulse PC produced from the electromagnetic pickup 204C is 46 (ms), and when the spacing $TD_3$ of the pulses $PD_2$ and $PD_3$ of the reference position pulse PD produced from the electromagnetic pickup 104D is 53 (ms), V can be given by the above formula as V=0.15. In FIG. 5, PS denotes an ignition command signal The time Tf from the reference position pulse $PC_4$ to $PD_4$ is predicted, from TF $=TC_4/2 - \Delta T$, as $\Delta T = 6/6(TD_3 = TC_4)$. The predicted time Tf and the time interval TS from the value of spark advance angle $\theta$ till the next ignition time can be given by the following formula:

$$TS = \frac{90 - \theta}{90} \times Tf$$

The ignition command selection means 115 sets the judged value Vr of the rate of variation at 0.1 for example, so that it will perform a similar ignition timing control as prior-art devices by selecting the ignition command output PS of the first ignition command output means 111 and outputs the ignition command signal PSPK to the ignition device 112 when the rate of variation V given by the rate of variation computing means 113 is under 0.1.

When the rate of variation V stated above is 0.1 or more, the ignition command selection means 115 selects and outputs, to the ignition device 112, the ignition command output PSD (FIG. 4d), as the ignition command signal PSPK (FIG. 4e), from the second ignition command output means 114 which outputs the ignition command signal simultaneously with the reference position pulse PD produced from the electromagnetic pickup 104D in place of the ignition command output PS (FIG. 4c) of the first ignition command output means 111. That is, when the value of the rate of variation V is 0.1 or more, the ignition takes place at the reference crank position.

At the time the reference position pulse $PC_4$ is inputted, the rate of variation V given by the rate of variation computing means 113 is 0.15, larger than the judged value Vr (0.1). Therefore, when there has occurred a variation shown in FIG. 4a and b, the ignition command output PSD of the second ignition command output means 114, not the ignition command output PS by $PS_4$ computed when the reference position pulse PC4 is inputted, is selected as an ignition command signal PSPK4 as shown in FIGS. 4c, d and e, thus igniting the mixture at the timing corresponding to the reference position pulse PD4. The reference position pulse PD is so set as to appear near TDC on the compression stroke of engine, so that, because the ignition is triggered in accordance with the ignition command output PSD, the stabilized combustion of the mixture in cylinders is done. This is effective to prevent a problem likely to be caused by abnormal spark advance (56° C.) in similar devices of prior art.

In the meantime, in common operating conditions, the engine speed varies most during racing after idling, rising about 100 rpm per firing period in the vicinity of 1,000 rpm. The rate of periodic variation at this time will be V=0.05 when calculated by the use of the formula (6).

As this value is less than the judged value Vr (=0.1) of the rate of variation described above, the ignition command output PS of the first ignition command output means 111 is selected as the ignition command signal PSPK, thereby controlling spark advance.

In the common operating conditions, the control of spark advance is properly performed as described above. In the event of any abnormal rotational variation, this variation can be immediately detected, and the ignition period during which the abnormal variation occurs can be changed so as to trigger the ignition at a specific crank angle. Accordingly, the ignition will not be abnormally advanced or retarded.

In the embodiment described above, the rate of variation in the rotational period of engine wa given by the formula (6), but it will be understood that the calculation of the rate of variation is not limited to the formula (6), but can be performed also by other formulas capable of calculating the abnormal rotational variation of engine by using a rotational period that can be obtained at least from the reference position pulse PC or PD. Also, it is natural that the judged value Vr of the rate of variation is not limited to 0.1 in the embodiment.

Furthermore, in the above embodiment, the reference crank angle position is detected by the use of two detectors such as the magnetic pickups 104C and 104D, but it will be understood that the reference crank position can be detected by the use of an angle detector designed to change the detection level from low to high, for example, at the reference position PC, and from high to low at the reference position PD. Further, it is allowed to use one magnetic pickup to detect in time sequence both the reference positions PC and PD and to use another detector to judge PC or PD.

In the second embodiment of the present invention, abnormal spark advance and retard can similarly be prevented as in the first embodiment as described above.

Figure 6:
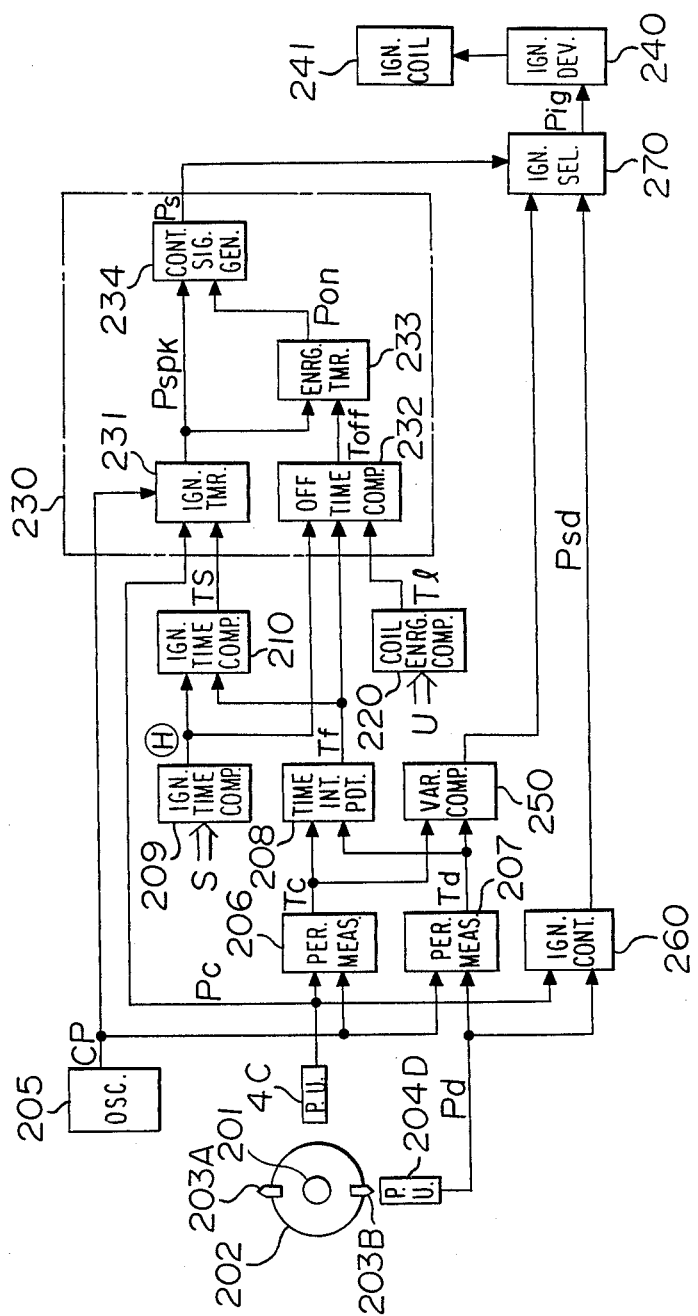
FIG. 6 is a block diagram of an ignition timing control device according to a third embodiment of the present invention.
Figure 7:
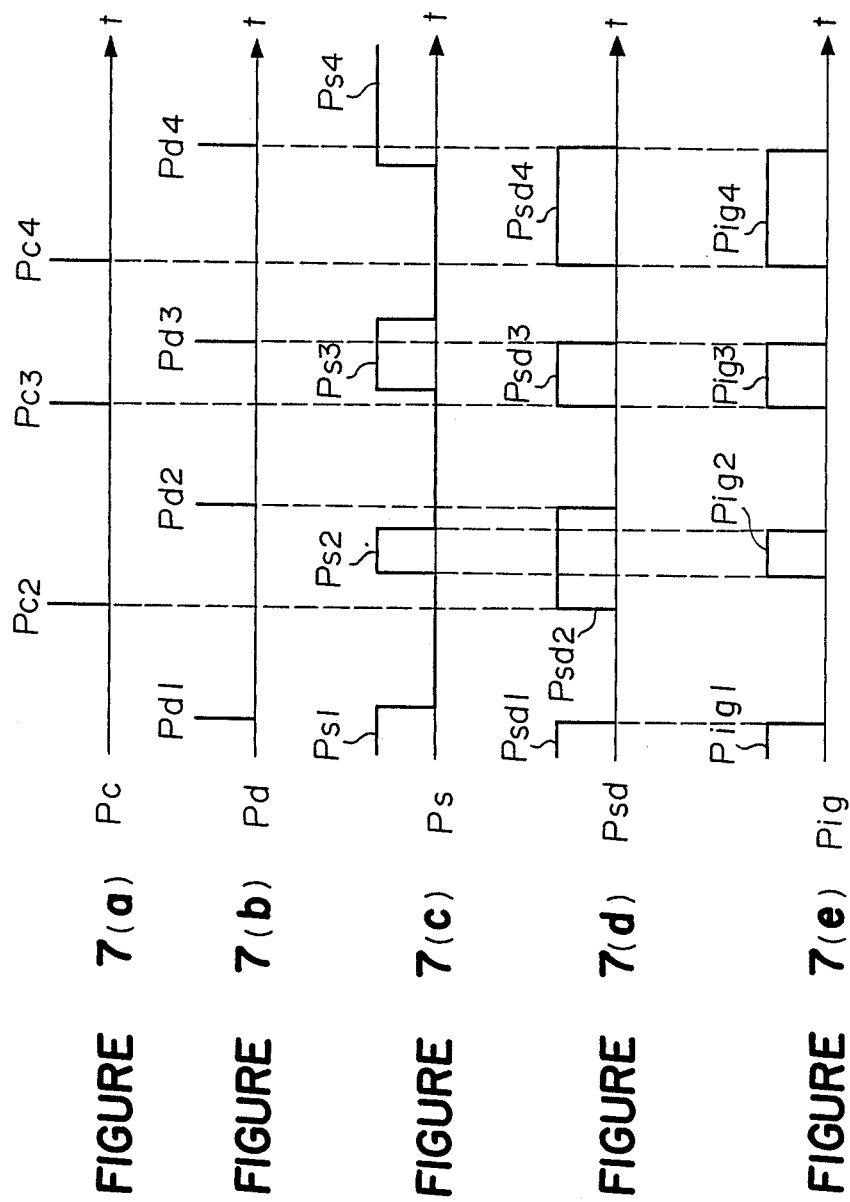
FIGS. 7(*a–e*) are an exemplary waveform diagram of operation in FIG. 6.

Hereinafter, a third embodiment of the present invention will be explained with reference to FIGS. 6 to 8. In FIG. 6, numeral 201 is a crankshaft of a four-stroke-cycle, four cylinder engine, and numeral 202 is a circular disc fixed on this crankshaft and rotating with the rotation of the crankshaft. On the circumference of this circular disc are fixedly mounted magnetic bodies 203A and 203B disposed 180 degrees apart. Numerals 204C and 204D denote electromagnetic pickups which are arranged close the outer periphery of the circular disc 202 and produce reference position pulses Pc and Pd when they face the magnetic body 203A or 203B. The electromagnetic pickup 204D is provided to detect the crank angle position near TDC on the compression stroke of engine, while the electromagnetic pickup 204C is disposed 90 degrees apart from the electromagnetic pickup 204D in the outer periphery of the circular disc 202, so that the reference position pulses Pc and Pd will be produced alternately every 90 degrees of rotation of the crankshaft 201. Numeral 205 represents an oscillator which outputs a clock pulse CP. Numerals 206 and 207 indicate first and second period measuring means which measure the pulse spacing Tc of the reference position pulse Pc and the pulse spacing of the reference position pulse Pd on the basis of the clock pulse CP of the oscillator 205. Numeral 208 is a time interval predictive means for determining the time interval Tf corresponding to the engine-speed acceleration by deducting a measured period given by the first period measuring means 206 from a measured period given by the second period measuring means 207 when the reference position pulse Pc is inputted. Numeral 209 denotes an ignition timing computing means which computes the spark advance angle $\theta$ from the crank reference position to be detected by the electromagnetic pickup 204D on the basis of the information S on the engine speed and manifold pressures. Numeral 220 is a coil energizing time computing means which computes the required coil energizing time T1 of an ignition coil 241 from the information U as to the battery voltage and so forth. And numeral 210 represents an ignition time computing means which computes and outputs the time Ts from the input of the time interval Tf and the spark advance angle $\theta$ and the delivery of the reference position pulse Pc till the ignition control signal PS, simultaneously with the reference position pulse Pc, by a method described later. A first ignition control signal means 230 which receives the time Ts from this ignition time computing means 210, the energizing time T from the energizing time computing means 20, the time interval Tf, the spark advance angle $\theta$, the clock pulse CP, and the reference position pulse Pc, is constituted of an ignition timer 231 which produces an ignition timing signal Pspk for interrupting the current of the ignition coil 241 when the time Ts from the input of the reference position pulse has elapsed; an OFF time computing circuit 232 which determines the ignition coil 241 deenergizing time (OFF time) Toff from the time interval Tf, the ignition coil energizing time T1, and the spark advance angle $\theta$; an energizing timer 233 which produces an energizing timing signal Pon for initiating the energizing of the ignition coil after the lapse of the OFF time Toff from the time when the ignition timer 231 gives out the ignition timing signal Pspk; and an ignition control signal generating circuit 234 which produces an ignition control signal Ps by which the electric state is reversed from the "L" level to the "H" level simultaneously with the energizing timing signal Pon, and from the "H" level to the "L" level simultaneously with the ignition timing signal Pspk. This ignition control signal Ps operates the ignition device 240, operating the ignition coil 241 to ignite the mixture.

Numeral 250 denotes a rate of variation computing means which determines the rate of variation in the rotational period of engine by calculating the measured period Tc inputted from the first period measuring means 206 and the measured period Td inputted from the second period measuring means 207. Numeral 260 indicates a second ignition control signal means which outputs a signal Psd, as an ignition control signal, for initiating the energizing of the ignition coil 241 at the time the reference position pulse Pc is inputted and for interrupting the current to the ignition coil 241 at the time the reference position pulse Pd is inputted. Numeral 270 is an ignition control signal selection means which is so constituted as to select, in accordance with the result of calculation by the rate of variation computing means 250, the ignition control signal Ps of the first ignition control signal means 230 when the rate of variation is less than the specific judged value Vr of the rate of variation, and the ignition control signal Psd of the second ignition control signal means 60 as the ignition control signal Pig when the rate of variation V is over the judged value Vr of the rate of variation, and gives out the ignition control signal Pig to the ignition device 240.

The rate of variation computing means 250 is used to determine the rate of variation V in the rotational period of engine by the use of, for example, the following formula (7).

$$V = \frac{Tc_3 - Tc_4}{Tc_4} \qquad (7)$$

Figure 8:
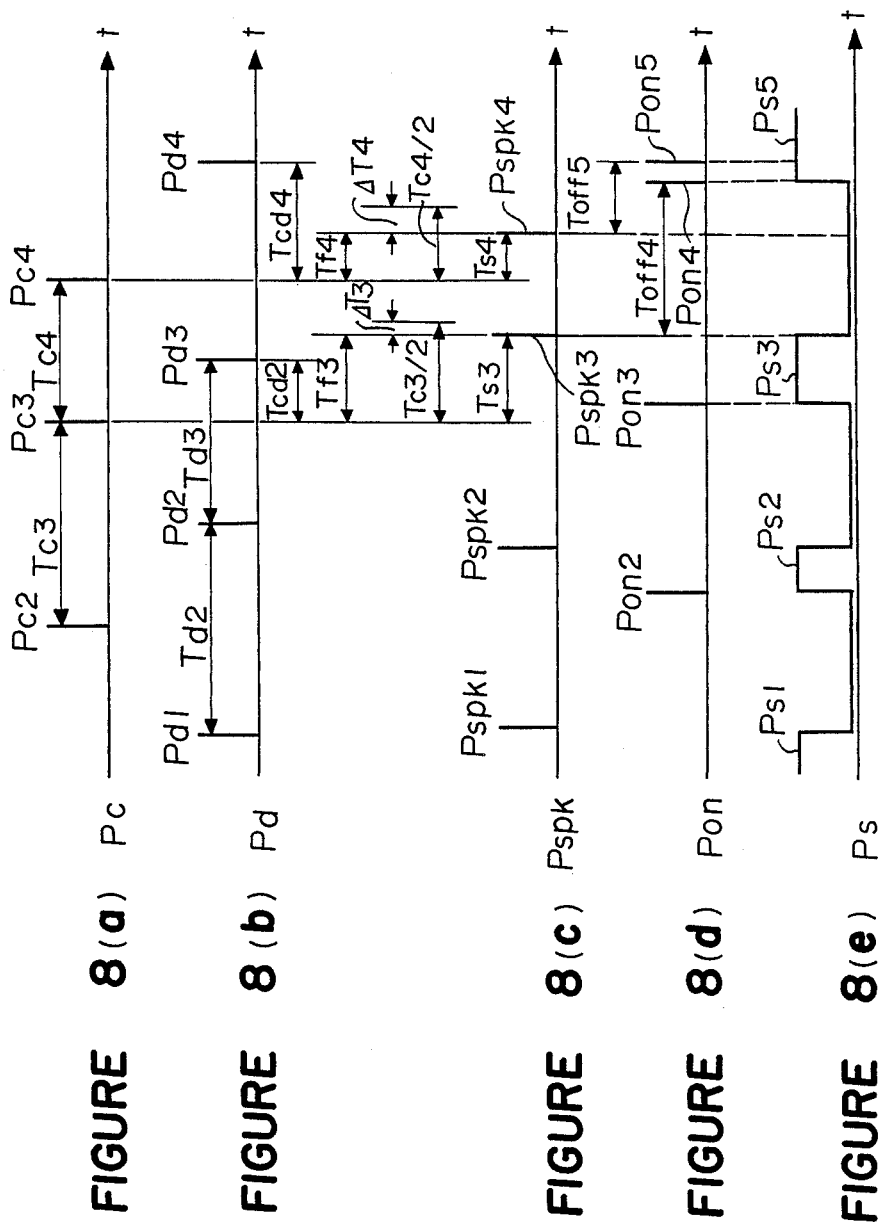
FIGS. 8(*a–e*) are an exemplary diagram of operation of the typical ignition control device.

Now, suppose that, in the engine speed varying condition as shown in FIG. 8, the pulse spacing $Tc_3$ between $PC_2$ and $PC_3$ of the reference position pulse PC sent out from the electromagnetic pickup 4C and the pulse spacing $TC_4$ between $PC_3$ and $PC_4$ are 65 ms and 46 ms respectively, V=0.41 can be given by the above formula.

In FIG. 8, $Pd_1$, $Pd_2$, $Pd_3$, ... are reference position pulses from the electromagnetic pickup 4D, $Td_2$ and $Td_3$ are pulse spacings; $Pspk_1$, $Pskpk_2$, ... are ignition timing signals produced from the ignition timer 231; $Pon_2$, $Pon_3$, ... are energizing timing signals produced from the energizing timer 233 after the generation of the ignition timing signals; and $Ps_1$, $Ps_2$, ... are ignition control Signals produced from the ignition control signal generating circuit 234.

Here, let ΔT be an acceleration corresponding time taking place with a change in engine speed, and when the engine speed is not constant as during acceleration and deceleration, the time can be predicted as $$Tf = Tc_3/2 - \Delta T. \qquad (8)$$

To give the acceleration corresponding time ΔT, a time calculated by the following formula (9) from the periods $Tc_3$ and $Td_2$ measured by the first and second period measuring means is used in order that predictive calculation may be made with the least error within a range of engine speeds and speed acceleration in ordinary use, for example, in cars in general use.

$$\Delta T = 6/5 \times (Td_2 - Tc_3). \qquad (9)$$

Subsequently, the ignition time computing means 210 gives by the following formula the time $Ts_3$ (FIG. 7b) till the next ignition time, from the time interval Tf given by the formula (8) and the value of spark advance angle θn.

$$TS = \frac{90 - \theta}{90} \times Tf \qquad (10)$$

As previously stated, the ignition timer 231 produces the ignition timing signal Pspk after the lapse of the time Ts given by this formula 10 from the appearance of the reference position pulse $Pc_3$, thus the ignition coil 241 current being interrupted to ignite the mixture in the engine.

The start of the next supply of the ignition coil 241 current is controlled according to the OFF time Toff from the present ignition till the start of the next current supply which is obtained by the off time computing circuit 232. That is, in this off time computing circuit 232, the time $2 \times Tf - T1$ is given by deducting the required energizing time T1 determined by the energizing time computing means 220, from the time interval corresponding to the angle of rotation of the engine crankshaft, 180 degrees, obtainable by doubling the time interval Tf corresponding to the angle of rotation of the engine crankshaft, 90 degrees, previously given by the time interval predictive means 208. Furthermore, a time corresponding to an angular difference between the present spark advance angle θn and the next spark advance angle θn+1 is added to calculate the off time by the formula (11).

$$Toff = 2 \times Tf - Tl + \frac{\theta n - \theta n + 1}{90} \times Tf. \qquad (11)$$

The ignition control signal selection means 270 sets the judged value Vr of the rate of variation to, for example, 0.15, and when the rate of variation V obtained by the rate of variation computing means 250 is under 0.15, it will select the ignition control signal Ps of the first ignition control signal means 230, and outputs the ignition control signal Pig to the ignition device 40, thus similarly controlling the ignition timing as in conventional devices.

Also, when the rate of variation V stated above is 0.15, the ignition control signal selection means 270 selects and outputs as the ignition control signal Pig (FIG. 7e), to the ignition device 240, the ignition control signal Psd (FIG. 7d) of the second ignition control signal means 260 which produces the ignition control signal simultaneously with the reference position pulse Pd generated from the electromagnetic pickup 104D in place of the ignition control signal Ps (FIG. 7c) of the first ignition control signal means 230. Namely, when the value of the rate of variation V is 0.15 and more, the supply of the ignition coil 241 current is started simultaneously with the input of the reference position pulse Pc, thereby interrupting the current to the ignition coil simultaneously with the reference position pulse Pd to ignite the mixture in the engine.

When there has occurred the variation shown in FIGS. 7a and b, the rate of variation determined by the rate of variation computing means 250 at the time of input of the reference position pulse $Pc_3$ is 0.41, larger than the judged value Vr of the rate of variation Vr (0.15). Therefore, the ignition control signal Psd of the second ignition control signal means 260 is selected as the ignition control signal $Pig_3$ as shown in FIGS. 7c, d and e, and the supply of the ignition coil current is started at the time of input of the reference position pulse $Pc_3$, thus performing ignition at the timing corresponding to the reference position pulse $Pd_3$. The reference position pulse Pd is so set as to appear in the vicinity of TDC on the compression stroke of the engine, and therefore the ignition by the ignition control signal Psd may not necessarily be the optimal method for providing the maximum efficiency, but is able to initiate substantially stabilized combustion in the engine, preventing a misfire likely to occur in prior-art devices.

In the meantime, the engine speed varies most during racing after idling in ordinary operating conditions, rising about 100 rpm per ignition period in the vicinity of 1,000 rpm. The rate of variation of period at this time will be V=0.1 when calculated by the formula (7).

As this value is under the previous judged value V (=0.15) of the rate of variation, the ignition control signal Ps of the first ignition control signal means 230 will be selected as the ignition control signal Pig, and the energizing and spark advance control will be carried out.

In ordinary operating conditions, the energizing and spark advance control are reliably performed as described above. In the event that any abnormal variation has occurred in the engine speed, the variation will immediately be detected, and the ignition at the ignition period at which the variation occurred can be changed to take place at a specific crank angle. Therefore, there will occur no abnormal spark advance and retard, and the energizing of the ignition coil at the specific crank angle different from the ignition will be started without a misfire.

In the above described embodiment, the rate of variation V of the rotational period of engine was given by the formula (7), but the calculation of the rate of variation is not limited to this formula (7) and may be performed by any other formula capable of detecting an abnormal variation in engine speeds by the use of a rotational period obtainable at least from the reference position pulse Pc or Pd. Also the judged value Vr of the rate of variation is naturally not limited to 0.15 indicated in the embodiment.

Furthermore, although two detectors of the magnetic pickups 104C and 104D were used in the above embodiment to detect the reference crank angle position, the control device may be so constituted as to detect two reference crank positions by an angle detector adapted to change the detection level from LOW to HIGH at for example the reference position Pc, and from HIGH to LOW at the reference position Pd, and, in addition, to detect both the reference positions Pc and Pd in time sequence by one magnetic pickup, to judge Pc and Pd by another detector.

According to the third embodiment of the present invention, the control device is constituted such that when the rate of variation in the rotational period of engine exceeds its specific rate, a specific reference crank position detecting signal is used, in place of the ignition control signal, to initiate the energizing of the ignition coil, and an ignition control signal is given out to the ignition device, using the specific reference crank position detecting signal differing from the signal for initiating the energizing of the ignition coil, at the ignition point. Even when there has happened any abnormal variation in the rotational period of engine, therefore, it is possible to energize the ignition coil reliably and control the ignition timing properly to the specific reference crank angle position, preventing abnormal spark advance and retard.

What is claimed is:

1. An ignition timing control device, comprising: a period measuring means for measuring the rotational period of an engine from a time required by an engine crankshaft to rotate through a specific range of crank angle; an ignition timing computing means for computing an ignition timing according to engine operating conditions; an ignition time computing means for computing a time from a specific crank angle position to the ignition timing, from said measured rotational period and said ignition timing computed by said ignition timing computing means; a first ignition command signal output means for outputting an ignition command signal to an ignition device after the lapse of a time computed by said ignition timing computing means after the time of detection of said specific crank angle position; a reference position detecting means for producing a reference position signal at a specific reference crank position of said engine; a second ignition command signal output means for outputting an ignition command signal at the time of generation of said reference position signal; memory means for storing said measured rotational period; a rate of variation computing means for comparing for computation between the rotational period previously stored in said memory means at the time of measurement of said rotational period and the present measured rotational period; and a means for selecting and outputting an ignition command signal to said ignition device such that the next ignition will be performed by the ignition command signal of said second ignition command signal output means when there has taken place a variation in the rotational period exceeding a specific rate of variation.

2. An ignition timing control device as claimed in claim 1, wherein said second ignition signal output means outputs an ignition command signal simultaneously with a detection signal from electromagnetic pickups rotating together with the rotation of magnetic bodies attached on said crankshaft.

3. An ignition timing control device as claimed in claim 1, wherein said rate of variation computing means computes signals outputted from said period measuring means and said memory means every time it receives said reference crank position signal, to obtain the rate of variation in the rotational period of engine therefrom, and sends an output signal corresponding thereto to said ignition command signal selection-output means.

4. An ignition timing control device as claimed in claim 1, wherein said ignition command signal selection-output means receives signals from said first and second ignition command output means, and selects and outputs signals from said first and second ignition command output means to the ignition device on the basis of a result of comparison between a rate of variation signal from said rate of variation computing means and a set judged value of the rate of variation.

5. An ignition timing control means, comprising: a first reference position detecting means for producing a first reference position signal when the an engine crankshaft is in a specific crank angle position; a second reference position detecting means for producing a second reference position signal at a specific crank angle position differing from said crank angle; an ignition timing computing means for computing the ignition timing according to engine operating conditions; a rotational period measuring means for determining the rotational period of the engine at least from said first or second reference position signal; an ignition time computing means for computing the time from said first reference position until the ignition timing, from said rotational period and the ignition timing computed by said ignition timing computing means; a first ignition command signal output means for outputting an ignition command signal to the ignition device after the lapse of a time computed by said ignition time computing means from the generation of said first reference position signal; a second ignition command output means for outputting an ignition command signal when said second reference position signal is produced; a period variation computing means for determining a variation in the rotational period of the engine from the rotational period of the engine between different crank angle positions which are given at least by said first or second reference position signal; and a means for selecting and outputting an ignition command signal to the ignition device such that when the output of said period variation computing means exceeds a specific rate of variation, ignition is performed by the ignition command signal from said second ignition command signal output means.

6. An ignition timing control device as claimed in claim 5, wherein said second ignition command signal output means outputs an ignition command simultaneously with a detection signal produced from one of two electromagnetic pickups coacting with one of two magnetic bodies mounted on the engine crankshaft.

7. An ignition timing control device as claimed in claim 5, wherein said rate of variation computing means receives signals from said first and second rotational period measuring means and computes the rate of variation V in the rotational period of the engine by the following formula:

$$V = \frac{|TD - TC|}{TC}$$

where TC is a period measured by said first period measuring means, and TD is a period measured by the second period measuring means.

8. An ignition timing control device as claimed in claim 5, wherein said ignition command selection means receives signals from said first and second ignition command output means and selects to output signals from said first and second ignition command output means to the ignition device on the basis of a comparison performed between a rate of variation signal from said variation computing means and a set judged value of the rate of variation.

9. An ignition timing control device, comprising: a first reference position detecting means for producing a first reference position signal at a specific crank angle position of an engine; a second reference position detecting means which produces a second reference position signal at a specific crank angle position differing from said crank angle; a rotational period measuring means for determining the rotational period of the engine at least from said first or second reference position signal; an ignition timing computing means for computing an ignition timing according to engine operating conditions; an energizing time computing means for computing an ignition coil energizing time; an ignition time computing means for computing a time from said first reference position until the ignition timing, from said rotational period and ignition timing; a first ignition control signal output means which outputs to the ignition device a first ignition control signal for starting to energize the ignition coil before the time from the ignition timing until the energizing of the ignition coil, and for interrupting the ignition coil current after the lapse of a time resulting from computation by said ignition time computing means from the time said first reference position signal is produced; a second ignition control signal output means which outputs a second ignition control signal for starting to energize the ignition coil when said first reference position signal is produced, and for interrupting the ignition coil current when said second reference position signal is produced; a period variation computing means for determining the rotational period of the engine from the rotational period of the engine between different crank angle positions obtainable at least from said first and second reference position signals and a means for selecting and outputting an ignition control signal to the ignition device so that when the output of said period variation computing means exceeds a specific value, said second ignition control signal is used to control the ignition coil.

10. An ignition timing control device as claimed in claim 9, wherein said second ignition control signal output means outputs an ignition control signal simultaneously with a detection signal from one of two electromagnetic pickups coacting with one of two magnetic bodies mounted on the engine crankshaft.

11. An ignition timing control device as claimed in claim 9, wherein said period variation computing means receives signals from said first and second period measuring means and computes the rate of variation V in the rotational period of the engine.

12. An ignition timing control device as claimed in claim 9, wherein said ignition control signal selection-output means receives signals outputted from said first and second ignition control signal output means, and selects and outputs signals from said first and second ignition control signal selection-output means to the ignition device on the basis of a result of comparison with a judged value of the rate of variation from said period variation computing means.

* * * * *